United States Patent [19]
Brancati

[11] Patent Number: 4,885,774
[45] Date of Patent: Dec. 5, 1989

[54] BRACKET FOR ARMORED CORD

[75] Inventor: Rudolph P. Brancati, Richmond Hill, N.Y.

[73] Assignee: Nynex Corporation, New York, N.Y.

[21] Appl. No.: 76,384

[22] Filed: Jul. 22, 1987

[51] Int. Cl.$^4$ .............................................. H04M 1/15
[52] U.S. Cl. .................................. 379/438; 174/65 G; 439/449
[58] Field of Search .............. 379/438, 428, 437, 451, 379/442; 174/65 R, 65 G; 439/449

[56] References Cited

U.S. PATENT DOCUMENTS 3,377,442  4/1968  Foster, Jr. .......................... 379/438
4,518,830  5/1985  Drexler et al. ..................... 379/438

OTHER PUBLICATIONS

AT&T Retaining Bracket Installation Instructions.

Primary Examiner—Jin F. Ng
Assistant Examiner—Danita R. Byrd
Attorney, Agent, or Firm—Douglas J. Kirk; John J. Torrente

[57] ABSTRACT

A bracket for connecting an armored cord to a telephone housing in which the bracket is of unitary construction and comprises a bottom plate having a central portion with a laterally running slot adapted to receive the sheath of the armored cord and a top U-shaped plate overlying the central portion of the bottom plate and having a laterally running slot adapted to receive the flexible cable of the armored cord and to provide an abutment for the end termination of the cable.

12 Claims, 1 Drawing Sheet

BRACKET FOR ARMORED CORD

BACKGROUND OF THE INVENTION

This invention relates to a connecting bracket and, in particular to a bracket for connecting an armored cord to the housing of a telephone set.

Armored cords have been used for many years in public telephones as a means of connecting the handset of the phone to the phone housing. One type of armored cord in use today comprises a flexible outer sheath which houses the telephone conductors and which also houses a strength member comprised of a flexible cable. The strength member is provided with terminations in the form of swaged ends which help secure the armored cord to the telephone housing and to the handset.

At present, the available brackets for connecting the armored cord to the telephone housing comprise three-pieces or elements. In particular, U.S. Pat. No. 4,518,830 discloses one type of three-piece bracket in which the sheath and flexible cable with its swaged end termination of the armored cord are passed through an aperture in a mounting member. The sheath is held in the aperture by engagement of a crimped section of the sheath with a reduced section of the aperture.

A U-shaped spacer member is then situated adjacent the aperture and has a cutout on a first one of its legs. The flexible cable and swaged end termination after passing through the aperture in the mounting member pass between the legs of the U-shaped member, while the conductors of the armored cord pass along the cutout of the one leg.

A further inverted U-shaped securing member follows and overlies the spacer member and has a slot running along one leg and along the bridge connecting its legs. The flexible cable is passed through this slot from the bottom of the one leg so that the bottom of the swaged end termination abuts the top surface of the connecting bridge.

The U-shaped securing member and the mounting member are both provided with side flanges or tabs having holes which align when the three elements of the bracket are put together. These holes, in turn, are aligned with a hole in the telephone housing. When the bracket is being utilized, a screw is passed through the aligned holes to secure this end of the bracket to the housing. A further tab is provided on the other end of the mounting member and this tab interfits with a bridge shaped frame on the telephone housing to thereby secure the other end of the assembled bracket to the telephone housing.

The three-piece bracket described in the '830 patent is typically for telephone sets where the dial or key housing is made of metal. For telephone sets where the dial housing is made of plastic, the mounting member is somewhat different. In particular, the aperture in the mounting member extends to an edge of the member, while the hole which aligns with the hole in the securing member is towards the middle of the mounting member and not on a tab. Finally, the mouting member does not have a tab for engagement with a bridge on the telephone housing.

As can be appreciated, use of the aforesaid three-piece brackets is extremly tedious since installation of an armored cord with the brackets requires the coordination of three elements. Accordingly, installers in the field find them difficult if not impossible to use. As a result, they often devise there own techniques for quickly connecting the armored cord to the telephone housing. Unfortunately these techniques, in some cases, have proven unsatisfactory with the result that the cord may be pulled from the housing causing exposure and shorting of the condutors, and eventual failure of the telephone set.

While consideration might be given to making the prior art three-piece brackets as a unit, there construction and interrelationship are such that this cannot be accomplished and still arrive at a usable bracket. Accordingly, there exists a need for a bracket which is both unitary in nature and readily usable for armored cord connection.

It is therefore a primary object of the present invention to provide a bracket for connecting an armored cord to the housing of a telephone set which does not suffer from the above-mentioned disadvantages.

It is a further object of the present invention to provide a bracket for connecting an armored cord to a telephone set which is constructed so that it can be installed with a minimum of effort and time.

It is a further object of the present invention to provide a bracket for connecting an armored cord to a telephone set, which bracket is configured in such a way that the bracket can be made as a unitary piece.

SUMMARY OF THE INVENTION

In accordance with the principles of the present invention the above and other objectives are realized in a unitary bracket comprised of a bottom plate whose central portion has first and second laterally running edges and first and second longitudinally running edges. An end section extends longitudinally from at least one of the lateral edges of the central portion and is adapted to be connected to the telephone housing. A slot adapted to receive and engage the sheath of the armored cord extends from the first longitudinal edge of the central portion and runs laterally therefom. An inverted U-shaped upper plate overlies the central portion of the bottom plate and is integral therewith. The U-shaped upper plate includes first and second legs and a bridge connecting these legs all of which extend laterally. The connecting bridge has first and second longitudinal edges which are situated closer to the first and second longitudinal edges, respectively, of the central portion of the bottom plate. A slot runs laterally in the connecting bridge from the second longitudinal edge and is adapted to receive the flexible cable of the armored cord and to act as an abutment for the end termination.

With the unitary construction and the particular configuration described above for the bracket of the invention, the bracket can be connected to the the armored cord and thereafter to the telephone housing with little effort and in a minimum amount of time. In particular, the armored cord is connected to the bracket by inserting the sheath, cable and end termination into the opening defined by the U-shaped top plate and the central portion of the bottom plate from the first longitudinal edge of the bottom plate. The sheath is then bent downwardly to engage the slot in the central portion. The cable and end termination are thereafter continued through the opening until the termination passes the first longitudinal edge of the top plate. At this point the cable is slid into the slot in the connecting bridge and the end termination is slid over the top surface of the bridge, which surface now acts as an abutment. The cord is thereby secured to the bracket. The bracket, in turn, is then secured to the housing by the end section.

BRIEF DESCRIPTION OF THE DRAWINGS

The above and other features and aspects of the present invention will become more apparent upon reading the following detailed description in conjuction with the accompanying drawings, in which.

DETAILED DESCRIPTION

Figure 1:
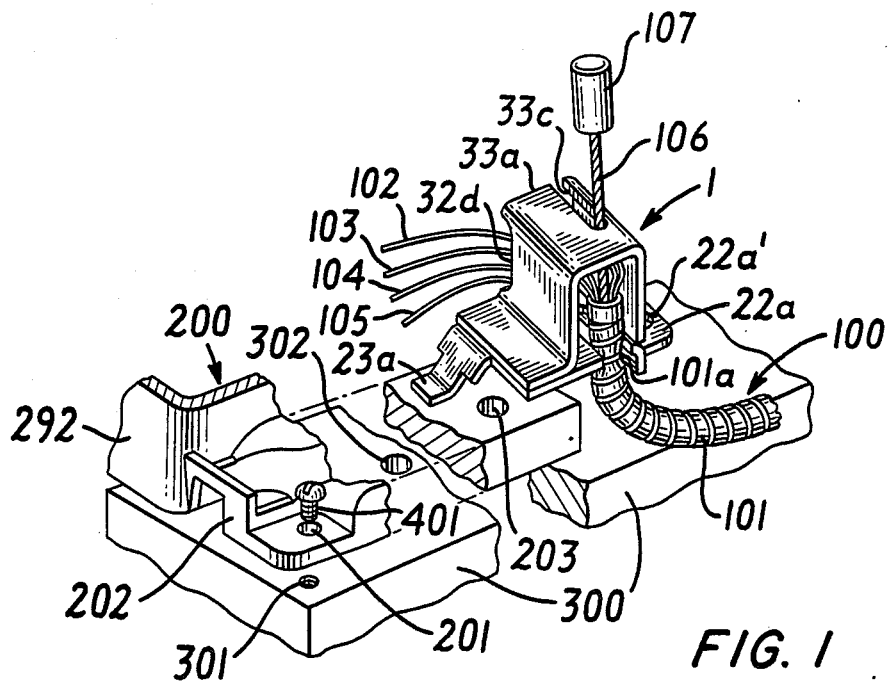
FIG. 1 is an exploded perspective view of the bracket of the invention being utilized to connect an armored cord to a telephone housing.
Figure 2:
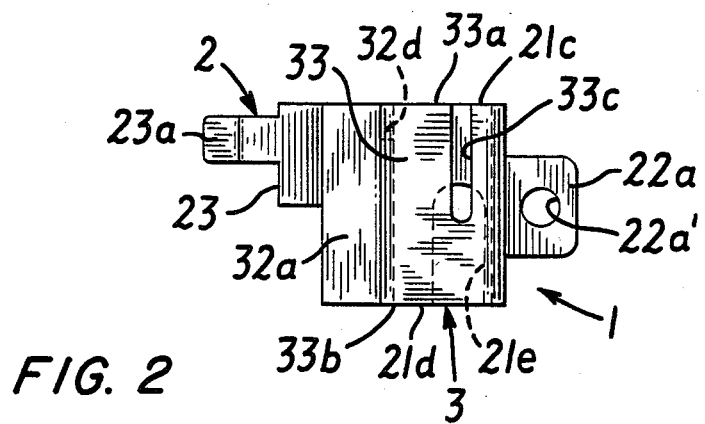
FIG. 2 is a top plan view of the bracket of FIG. 1.
Figure 3:
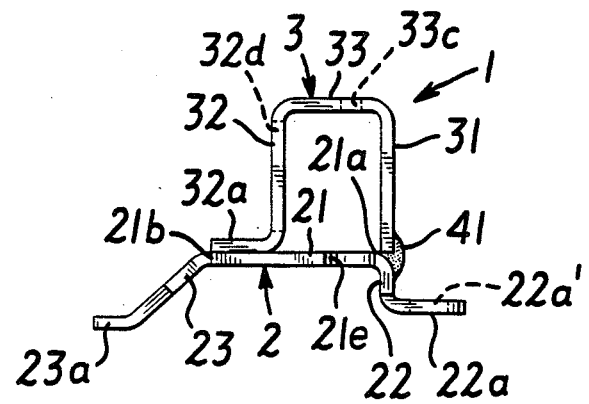
FIG. 3 is a side view of the bracket of FIG. 1.

Referring to the figures, a bracket 1 in accordance with the invention is utilized to connect an armored cord 100 to the key housing 200 of a telephone set which typically might be a pay station telephone set. The key housing 200, in turn, is itself connected to the telephone housing 300 via aligned holes 201 and 301 in the respective members and screw 401.

The armored cord 100 is brought through the telephone housing 300 b way of a through bore 302 in the housing. The cord 100 comprises a flexible outer sheath 101 which is crimped at 101a and in which is housed the telephone conductors 102-105. A strength member in the form of a flexible cable 106 is also housed in the sheath for added strength. The cable 106 has a swaged end termination 107 which is of larger diameter than the diameter of the sheath 101 to prevent the cable from being entirely drawn into the sheath.

As shown, the key housing 200 is of the metal type and is provided with a bridge shaped member 202 and a vertically spaced receiving aperture on bore 203. These elements are utilized in conjunction with the bracket 1 to connect the armored cord 100 to the telephone housing 300.

More particularly, in accordance with the invention, the bracket 1 is formed as a unitary structure comprised of bottom and top plates 2 and 3 which are made integral. The bottom plate 2 has a central portion 21 which ends with two spaced laterally running edges 21a and 21b and two spaced longitudinally running edges 21c and 21d.

The bottom plate also has two side portions 22 and 23. The side portion 22 extends from the lateral edge 21a of the central portion initially downwardly and then longitudinally ending in a tab portion 22a having a hole 22a'. The side portion 23, in turn, also curves downwardly and then extends longitudinally, in this case from the edge 21b of the central portion 21. The portion 23 likewise ends in a tab 23a. When the bracket 1 is in place on the key housing 200, the hole 22a' in the tab 22 aligns with the housing hole 203 and the tab 23a slides under and engages the housing the bridge 202, thereby facilitated connection of the bracket to the housing.

The top plate 3 of the bracket 1 is in the form of an inverted U-shaped member and overlies the central portion 21 of the bottom plate 2. The legs 31 and 32 of the top plate extend laterally and are connected by a bridge 33 which is in parallel relationship with the central portion of the bottom plate. The lower end of the leg 32 has a flange portion 32a which abuts the region of the central portion adjacet the edge 21b. This flange portion is welded to the central portion 21 by welds (not visible.) Similar welds 41 are used to weld the lower edge of the leg 31 of the U-shaped upper plate 3 to the lateral edge 21a of the central portion 21.

The central portion 21 of the bottom plate is further provided with a slot 21e which runs laterally from the longitudinal edge 21d of the central portion of the bottom plate to a point short of the longitudinal edge 21c. The slot 21e is of a dimension (width) to receive and engage the sheath of the armored cord in the crimped section 101a. Likewise, the bridge of the top plate 3 is provided with a slot 33c which runs laterally from the edge 33a of the of the bridge and which ends at a point short of the opposing longitudinal edge 33b. The slot 33c is of a width to allow passage therethrough of the flexible cable 106 but not the swaged end termination 107.

When using the bracket 1 to connect the armored cord 100 to the telephone housing 300, the sheath 101, flexible cable 106 swaged end termination 107 and conductors 102-105 are introduced into the cavity defined by the U-shaped top plate 3 and the central portion 21 of the bottom plate 2 from the side adjacent the edge 21d of the central portion 21. The sheath at the crimped portion is then bent downwardly so the the crimped section 101a enters the slot 21e, thereby causing the sheath to be engaged by and held in the slot. The flexible cable 106, end termination 107 and conductors 102-105 are then pulled through the cavity, with the latter conductors passing out therefrom via a cutout section 32d in the leg 32 of the U-shaped upper plate. The end termination 107, in turn, upon clearing the lateral edge 33a of the connecting bridge is slid over the upper surface of the bridge, while the cable 106 is introduced into the slot 33c. At this point, the swaged end termination abuts the top surface of the bridge, and the cable 106 and end termination 107 are thereby held in place.

With the armored cord 100 so held in the bracket 1, the bracket is then fastened to the key housing by slipping the tab 23a under the bridge 202 and aligning the hole 22a' in the tab 22a with the hole 203 in the key housing. A screw is then introduced into the aligned holes to fasten the bracket to the housing. As can be appreciated, therefore, the bracket 1 of the invention because of its unitary construction and particular configuration allows the armored cord to be simply and readily connected to the bracket and the bracket just as easily connected to the key housing 200 and, thus, the telephone housing 300.

It should also be noted that while the bracket of the invention has been illustrated with particular reference to a metallic key housing 200, the bracket can be directly used without change with plastic key housings as well. This is unlike the prior art practices where different three piece brackets were required for the different key housings.

In all cases, it is understood that the above-identified arrangements are merely illustrative of the many possible spedific embodiments which represent applications of the present invention. Numerous and varied other arrangements can readily devised in accordance with the principles of the present invention without departing from the spirit and scope of the invention. Thus, for example, the bottom plate 2 might only require one end section for connection to the telephone housing and this might be done directly to the housing and not via the key housing.

What is claimed is:

1. A bracket for securing an armored cord to the housing of a telephone, the armored cord comprising a flexible armored sheath having disposed therein a strength member including a flexible cable of first diameter having an end extending beyond the end of the sheath and a termination at the end of the cable of second diameter greater than the first diameter of the flexible cable, the bracket comprising:

a bottom plate including: a central portion having spaced first and second laterally running edges and spaced first and second longitudinally running edges, the central portion further having a slot running laterally from the first longitudinally running edge of the central portion for engaging and securing the sheath of the armored cord; and at least one end portion extending from the central portion, the end portion being adapted to be secured to the telephone housing;

and an inverted U-shaped top plate integral with and overlying the bottom plate so as to define with the central portion of the bottom plate a through opening extending between the first and second longitudinally running edges of the central portion of the bottom plate, the legs of the U-shaped member and the bridge connecting the legs running laterally and the connecting bridge having a first longitudinally running edge closer to the first longitudinally running edge of the central portion of the bottom plate than to the second longitudinally running edge of the central portion of the bottom plate and a second longitudinally running edge closer to the second longitudinally running edge of the central portion of the bottom plate than to the first longitudinally running edge of the central portion of the bottom plate, the connecting bridge further having a slot running laterally from the second longitudinally running edge of the connecting bridge toward the first longitudinally running edge of the connecting bridge and adapted to receive the flexible cable;

whereby the armored cord is secured to the bracket by inserting the cord within the through opening defined by the U-shaped member and the central portion of the bottom plate from the first longitudinally running edge of the central portion of the bottom plate, the sheath of the cord being bent downwardly to enter and be engaged by the slot in the central portion of the bottom plate and the flexible cable and end termination being pulled until the end termination clears the second longitudinally running edge of the connecting bridge of the U-shaped top plate and is slid thereover so the flexible cable is introduced into the slot in the connecting bridge and the end termination abuts the top surface of the connecting bridge to thereby secure the cable and end termination.

2. A bracket in accordance with claim 1 wherein: the housing of the telephone includes a securing means for the armored cord comprising a bridge shaped catch and a threaded hole spaced longitudinally from said bridged shaped catch;

and the central portion of the bottom plate has first and second end portions extending longitudinally from the first and second laterally running edges of the central portion, the first end portion having at an end a tab for engaging the bridge shaped catch of the securing means and the second end portion having at an end a securing portion with an aperture adapted to align with the hole in the securing means.

3. A bracket in accordance with claim 2 wherein: the housing of the telephone includes a key housing and said securing means is part of said key housing.

4. A bracket in accordance with claim 1 wherein: the sheath of the armored cord comprises a crimped section; and the slot in the central portion is adapted to receive the crimped section of the sheath.

5. A bracket in accordance with claim 2 wherein: one leg of the U-shaped top plate runs along and is secured to the second lateral running edge of the central portion of the bottom plate;

and the other leg of of the U-shaped top plate has a depending flange which overlies and is connected to the central portion of the bottom plate adjacent the first lateral edge of the central portion.

6. A bracket in accordance with claim 1 wherein: the slot in the central portion of said bottom plate extends laterally to a point short of the second longitudinal running edge of the bottom plate;

and the slot in the connecting bridge of the U-shaped top plate extends laterally to a point short of the first longitudinal running edge of the connecting bridge of the U-shaped top plate.

7. A bracket in accordance with claim 6 wherein: the slot in the central portion of the bottom plate runs adjacent the second laterally running edge of the central portion of the bottom plate;

and the slot in the connecting bridge runs adjacent the leg of the U-shaped top plate which is closest the second laterally running edge of the central portion of the bottom plate.

8. A bracket in accordance with claim 1 wherein: the leg of the U-shaped top plate which is closest the first laterally running edge of the central portion of the bottom plate has a cutout portion on its edge which is closest to the first longitudinal running edge of the central portion of the bottom plate and which runs from the connecting bridge to the bottom plate.

9. A bracket in accordance with claim 5 wherein: a weld secures the one leg of the U-shaped top plate to the first lateral running edge of the central portion of the bottom plate;

and a plurality of welds secure the flange of the other leg of the U-shaped top plate to the central portion of the bottom plate.

10. In combination:
a telephone including a telephone housing:
an armored cord for use with the telephone, the armored cord comprising a flexible armored sheath having disposed therein a strength member including a flexible cable of first diameter having an end extending beyond the end of the sheath and a termination at the end of the cable of second diameter greater than the first diameter of the flexible cable; and a bracket for connecting the armored cord to the telephone housing comprising:

a bottom plate including: a central portion having spaced first and second laterally running edges and spaced first and second longitudinally running edges, the central portion further having a slot running laterally from the first longitudinally running edge of the central portion for engaging and securing the sheath of the armored cord; and at least one end portion extending from the central portion, the end portion being adapted to be secured to the telephone housing;

and an inverted U-shaped top plate integral with and overlying the bottom plate so as to define with the central portion of the bottom plate a through opening extending between the first and second longitudinally running edges of the central portion of the bottom plate, the legs of the U-shaped member and the bridge connecting the legs running laterally and the connecting bridge having a first longitudinally running edge closer to the first longitudinally running edge of the central portion of the bottom plate than to the second longitudinally running edge of the central portion of the bottom plate and a second longitudinally running edge closer to the second longitudinally running edge of the central portion of the bottom plate than to the first longitudinally running edge of the central portion of the bottom plate, the connecting bridge further having a slot running laterally from the second longitudinally running edge of the connecting bridge toward the first longitudinally running edge of the connecting bridge and adapted to receive the flexible cable;

whereby the armored cord is secured to the bracket by inserting the cord within the through opening defined by the U-shaped member and the central portion of the bottom plate from the first longitudinally running edge of the central portion of the bottom plate, the sheath of the cord being bent downwardly to enter and be engaged by the slot in the central portion of the bottom plate and the flexible cable and end termination being pulled until the end termination clears the second longitudinally running edge of the connecting bridge of the U-shaped top plate and is slid thereover so the flexible cable is introduced into the slot in the connecting bridge and the end termination abuts the top surface of the connecting bridge to thereby secure the cable and end termination.

11. The combination of claim 10, wherein:
the housing of the telephone includes a securing means for the armored cord comprising a bridge shaped catch and a threaded hole spaced longitudinally from said bridged shaped catch;
and the central portion of the bottom plated has first and second end portions extending longitudinally from the first and second laterally running edges of the central portion, the first end portion having at an end a tab for engaging the bridge shaped catch of the securing means and the second end portion having at an end a securing portion with an aperture adapted to align with the hole in the securing means.

12. The combination of claim 11 wherein:
the housing of the telephone inclues a key housing and said securing means is part of said key housing.

* * * * *

UNITED STATES PATENT AND TRADEMARK OFFICE
CERTIFICATE OF CORRECTION

PATENT NO. : 4,885,774

DATED : December 5, 1989

INVENTOR(S) : Rudolph P. Brancati

It is certified that error appears in the above-identified patent and that said Letters Patent is hereby corrected as shown below:

```
Col. 1, line 68, change "there" to -- their --.
Col. 2, line  8, change "there" to -- their --.
Col. 3, line 24, change "300 b" to -- 300 by --.
Col. 3, line 56, delete "the", second occurrence.
Col. 3, line 57, change "facilitated" to -- facilitating --.
Col. 3, line 66, change "adjacet" to -- adjacent --.
Col. 3, line 68, change "(not visible.)" to -- (not visible). --.
Col. 4, line 11, delete "of the", second occurrence.
Col. 4, line 18, after "106" insert -- , --.
Col. 4, line 23, delete "the", second occurrence.
Col. 4, line 59, change "spedific" to -- specific --.
Col. 4, line 61, after "readily" insert -- be --.
Col. 6, line 13, change "lateral" to -- laterally --.
Col. 6, line 18, change " lateral" to -- laterally running --.
Col. 6, line 22, change "longitudinal" to -- longitudinally --.
Col. 6, line 25, change "longitudinal" to -- longitudinally --.
Col. 6, line 39, change "longitudinal" to -- longitudinally --.
```

Signed and Sealed this

Ninth Day of April, 1991

Attest:

HARRY F. MANBECK, JR.

*Attesting Officer*  *Commissioner of Patents and Trademarks*